United States Patent
Huang et al.

(10) Patent No.: US 12,407,609 B2
(45) Date of Patent: Sep. 2, 2025

(54) METHODS FOR SHUNTING CLUSTERED GATEWAYS

(71) Applicant: Beijing Baidu Netcom Science Technology Co., Ltd., Beijing (CN)

(72) Inventors: Zhifeng Huang, Beijing (CN); Wansheng Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 690 days.

(21) Appl. No.: 17/657,708

(22) Filed: Apr. 1, 2022

(65) Prior Publication Data
US 2023/0081696 A1 Mar. 16, 2023

(30) Foreign Application Priority Data
Sep. 10, 2021 (CN) .......................... 202111064467.9

(51) Int. Cl.
*H04L 45/7453* (2022.01)
*H04L 12/46* (2006.01)
(Continued)

(52) U.S. Cl.
CPC ...... *H04L 45/7453* (2013.01); *H04L 12/4633* (2013.01); *H04L 12/66* (2013.01); *H04L 61/256* (2013.01); *H04L 2212/00* (2013.01)

(58) Field of Classification Search
CPC . H04L 45/7453; H04L 12/4633; H04L 12/66; H04L 61/256; H04L 2212/00
See application file for complete search history.

(56) References Cited

U.S. PATENT DOCUMENTS 6,587,866 B1 * 7/2003 Modi .................. H04L 67/1023
709/240
6,697,380 B1 * 2/2004 Egbert .................. H04L 45/742
370/469
(Continued)

FOREIGN PATENT DOCUMENTS

CN 106980665 A * 7/2017 ............. G06F 16/21
CN 109802985 A 5/2019
(Continued)

OTHER PUBLICATIONS

Chinese First Search Report issued for Chinese Patent Application No. 2021110644679, received on Mar. 8, 2022.
(Continued)

*Primary Examiner* — Shean Tokuta
(74) *Attorney, Agent, or Firm* — ArentFox Schiff LLP (57) ABSTRACT

The present disclosure provides methods for shunting clustered gateways, which relate to the field of computer technologies, and in particular, relate to the technical field of data transmission. A specific implementation solution is: in response to receiving a first packet sent by a target internal network machine, a first hash value is acquired, wherein the first hash value is generated by a shunt of a public network gateway cluster, and the shunt is configured to perform a hash calculation on the first packet based on a pre-configured port dictionary; a target gateway machine is selected from the public network gateway cluster according to the first hash value; and the first packet is sent to the target gateway machine.

18 Claims, 5 Drawing Sheets

(51) Int. Cl.
   *H04L 12/66* (2006.01)
   *H04L 61/256* (2022.01)

(56) References Cited

U.S. PATENT DOCUMENTS

| | | | | |
|---|---|---|---|---|
| 6,748,437 | B1* | 6/2004 | Mankude | H04L 67/1023 |
| | | | | 709/227 |
| 8,259,585 | B1* | 9/2012 | S P | H04L 45/125 |
| | | | | 370/237 |
| 8,958,293 | B1* | 2/2015 | Anderson | H04L 67/1001 |
| | | | | 370/230 |
| 9,014,191 | B1 | 4/2015 | Mandel et al. | |
| 9,306,907 | B1* | 4/2016 | Lopez | G06F 16/9017 |
| 9,397,946 | B1* | 7/2016 | Yadav | H04L 41/0806 |
| 9,548,927 | B2* | 1/2017 | Luke | H04L 45/38 |
| 10,965,598 | B1* | 3/2021 | Sharma | H04L 47/125 |
| 11,099,099 | B1* | 8/2021 | Wei | G01M 3/3272 |
| 12,073,241 | B2* | 8/2024 | Shen | H04L 12/4633 |
| 2002/0097724 | A1 | 7/2002 | Halme | |
| 2005/0182841 | A1* | 8/2005 | Sharp | H04L 69/16 |
| | | | | 709/228 |
| 2013/0329727 | A1* | 12/2013 | Rajagopalan | H04L 12/4641 |
| | | | | 370/390 |
| 2015/0263899 | A1 | 9/2015 | Tubaltsev | |
| 2017/0104681 | A1* | 4/2017 | Azgin | H04L 45/46 |
| 2018/0157514 | A1* | 6/2018 | Malloy | H04L 45/306 |
| 2018/0192289 | A1 | 7/2018 | Dao | |
| 2020/0045087 | A1* | 2/2020 | Srinath | H04L 65/1101 |
| 2020/0351328 | A1 | 11/2020 | QIu | |
| 2020/0403922 | A1* | 12/2020 | Yu | H04L 45/586 |
| 2022/0206908 | A1* | 6/2022 | Brar | G06F 11/2005 |
| 2022/0263789 | A1* | 8/2022 | King | H04L 45/7453 |
| 2023/0036071 | A1* | 2/2023 | Goliya | H04L 63/164 |
| 2023/0081696 | A1* | 3/2023 | Huang | H04L 67/10 |
| | | | | 370/389 |
| 2023/0239274 | A1* | 7/2023 | Wang | H04L 61/2592 |
| | | | | 726/15 |

FOREIGN PATENT DOCUMENTS

| | | | | |
|---|---|---|---|---|
| CN | 108520025 B | * | 12/2020 | H04L 67/1097 |
| CN | 112333135 A | | 2/2021 | |
| CN | 112367261 A | * | 2/2021 | H04L 45/745 |
| CN | 109361609 B | * | 4/2021 | H04L 45/7453 |
| CN | 112632079 A | * | 4/2021 | G06F 16/2255 |
| CN | 110198307 B | * | 5/2021 | H04L 61/1511 |
| CN | 112866115 A | * | 5/2021 | H04L 45/745 |
| CN | 113630319 A | * | 11/2021 | |
| CN | 113794788 A | * | 12/2021 | |
| CN | 113810296 A | * | 12/2021 | H04L 12/4633 |
| CN | 112650704 B | * | 2/2024 | G06F 15/163 |
| EP | 4149087 A1 | * | 3/2023 | H04L 12/4633 |
| JP | 2016521090 A | | 7/2016 | |
| WO | WO-2021244450 A1 | * | 12/2021 | H04L 1/0002 |

OTHER PUBLICATIONS

Chinese Supplementary Search Report issued for Chinese Patent Application No. 2021110644679, received on Jun. 4, 2022.
Extended European Search Report issued for counterpart EP application No. 22166840.3 and issued on Sep. 15, 2022.
First Japanese Office Action issued for counterpart JP application No. 2022-139620 and issued on Nov. 28, 2023.
First Korean Office Action issued for counterpart KR application No. 10-2022-0111096 and issued on Dec. 12, 2024.

* cited by examiner

METHODS FOR SHUNTING CLUSTERED GATEWAYS

CROSS REFERENCE TO RELATED APPLICATIONS

The present application claims priority to Chinese Patent Application No. 202111064467.9, filed on Sep. 10, 2021, the disclosure of which is hereby incorporated by reference in its entirety.

TECHNICAL FIELD

The present disclosure relates to the field of computer technologies, and in particular, to the fields of cloud computing, data centers, and servers.

BACKGROUND

At present, shunting of clustered gateways is mainly implemented by achieving an algorithm for selecting a public network IP on a shunt, and all NAT rules in a cluster need to be configured on the shunt, so as to ensure that a user can select a correct public network IP among multiple public network IPs.

However, in the case of a cluster in a large scale, a implementation of shunting of clustered gateways on the basis of the public network IPs is relatively complex, and there are very high requirements on a capacity of memory and a capacity of table entries, and shunting of large-scale clustered gateways can be achieved only by means of cooperative work of a large number of servers.

SUMMARY

The present disclosure provides method for shunting clustered gateways.

According to one aspect of the present disclosure, a method for shunting clustered gateways is provided. The method may include: in response to receiving a first packet sent by a target internal network machine, a first hash value is acquired, wherein the first hash value is generated by a shunt of a public network gateway cluster, and the shunt is configured to perform a hash calculation on the first packet based on a pre-configured port dictionary; a target gateway machine is selected from the public network gateway cluster according to the first hash value; and the first packet is sent to the target gateway machine.

According to another aspect of the present disclosure, another method for shunting clustered gateways is provided. The method may include: a first packet is received from a shunt of a public network gateway cluster, wherein in response to the shunt receiving the first packet sent by a target internal network machine, a first hash value is acquired, and according to the first hash value, a target gateway machine is selected from the public network gateway cluster, wherein the first hash value is generated by the shunt performing a hash calculation on the first packet based on a pre-configured port dictionary; and forwarding the first packet to a public network on the basis of at least one target port corresponding to the first packet.

According to another aspect of the present disclosure, an apparatus for shunting clustered gateways is provided. The apparatus may include: a first acquisition component, configured to acquire, in response to receiving a first packet sent by a target internal network machine is received, a first hash value, wherein the first hash value is generated by a shunt of a public network gateway cluster, and the shunt is configured to perform a hash calculation on the first packet based on a pre-configured port dictionary; a second acquisition component, configured to select, according to the first hash value, a target gateway machine from the public network gateway cluster; and a diversion component, configured to divert the first packet to the target gateway machine.

According to another aspect of the present disclosure, another apparatus for shunting clustered gateways is provided. The apparatus may include: a receiving component, configured to receive a first packet from a shunt of a public network gateway cluster, wherein in response to the shunt receiving the first packet sent by a target internal network machine, a first hash value is required, and according to the first hash value, a target gateway machine is selected from the public network gateway cluster, wherein the first hash value is generated by the shunt performing a hash calculation on the first packet based on a pre-configured port dictionary; and a forwarding component, configured to forward the first packet to a public network on the basis of at least one target port corresponding to the first packet.

According to another aspect of the present disclosure, an electronic device is provided. The electronic device may include: at least one processor; and a memory in communication connection with the at least one processor, wherein the memory stores instructions which can be executed by the at least one processor, and the instructions are executed by the at least one processor, so that the at least one processor can perform the following steps: in response to receiving a first packet sent by a target internal network machine, a first hash value is acquired, wherein the first hash value is generated by a shunt of a public network gateway cluster, and the shunt is configured to perform a hash calculation on the first packet based on a pre-configured port dictionary; a target gateway machine is selected from the public network gateway cluster according to the first hash value; and the first packet is sent to the target gateway machine.

According to another aspect of the present disclosure, a non-transitory computer-readable storage medium, having computer instructions stored therein is provided, wherein the computer instructions are used for enabling a computer to perform the following steps: in response to receiving a first packet sent by a target internal network machine, a first hash value is acquired, wherein the first hash value is generated by a shunt of a public network gateway cluster, and the shunt is configured to perform a hash calculation on the first packet based on a pre-configured port dictionary; a target gateway machine is selected from the public network gateway cluster according to the first hash value; and the first packet is sent to the target gateway machine.

According to another aspect of the present disclosure, a computer program product is provided, when executed by a processor, performing following steps: in response to receiving a first packet sent by a target internal network machine, a first hash value is acquired, wherein the first hash value is generated by a shunt of a public network gateway cluster, and the shunt is configured to perform a hash calculation on the first packet based on a pre-configured port dictionary; a target gateway machine is selected from the public network gateway cluster according to the first hash value; and the first packet is sent to the target gateway machine.

It should be appreciated that the content as described in this part is neither intended to identify key or critical features of embodiments of the present disclosure, nor to limit the scope of the present disclosure. Other features of the present disclosure will become readily understood from the following description.

BRIEF DESCRIPTION OF THE DRAWINGS

The accompanying drawings are used to better understand the present disclosure, and do not constitute limitations to the present disclosure; wherein.

DETAILED DESCRIPTION OF THE EMBODIMENTS

Hereinafter, exemplary embodiments of the present disclosure are illustrated with reference to the accompanying drawings, in which various details of the embodiments of the present disclosure are included to facilitate understanding, and they shall be considered as merely exemplary. Accordingly, a person of ordinary skill in the art would recognize that various changes and modifications of embodiments described herein can be made without departing from a scope and spirit of the present disclosure. Also, for clarity and conciseness, illustrations of well-known functions and structures are omitted in the following description.

It should be noted that the terms "first", "second" etc. in the description, claims, and accompanying drawings of the present disclosure are used for distinguishing similar objects, and are not necessarily used to for describing a specific sequence or order. It should be understood that data so used may be interchanged, so that embodiments of the present disclosure described herein may be implemented in sequences except for those illustrated or described herein. In addition, the terms "include" and "have", and any variations thereof are intended to cover a non-exclusive inclusion, for example, a process, method, system, product, or device that comprises a series of steps or units is not necessarily limited to those steps or units that are clearly listed, but may comprise other steps or units that are not clearly listed or inherent to such process, method, product, or device.

To facilitate understanding of the embodiments of the present disclosure, some terms or nouns involved in the present disclosure will be explained below:

Clustered gateway, traffic for accessing a public network service through the same public network IP can be distributed on multiple machines of an NAT cluster.

Hash bucket, representing a container for holding different key code linked lists, and is a method for solving hash table conflicts. Multiple elements may exist in the same position of a hash table, and in order to deal with the hash collision, each position in the hash table represents one hash bucket. The hash table is a data structure directly accessed according to key codes.

According to the embodiments of the present disclosure, an embodiment of a method for shunting clustered gateways is provided. It should be noted that steps illustrated in flowchart of the drawings can be executed in a computer system such as a set of computer-executable instructions, and although a logical order is shown in the flowchart, in some cases, the steps shown or described can be executed in a different order from that described herein.

Figure 1:
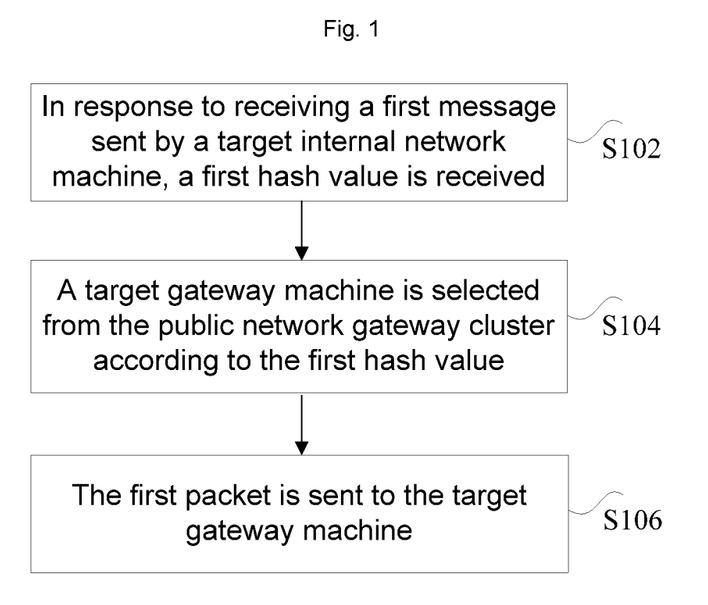
FIG. 1 is a flowchart of steps of a method for shunting clustered gateways according to a first embodiment of the present disclosure.

FIG. 1 is a flowchart of steps of a method for shunting clustered gateways according to a first embodiment of the present disclosure. As shown in FIG. 1, the method includes the following steps.

At step S102, in response to receiving a first packet sent by a target internal network machine, a first hash value is received, wherein the first hash value is generated by a shunt of a public network gateway cluster, and the shunt is configured to perform a hash calculation on the first packet based on a pre-configured port dictionary.

At step S104, a target gateway machine is selected from the public network gateway cluster according to the first hash value.

At step S106, the first packet is sent to the target gateway machine.

In the embodiments of the present disclosure, the first packet is an original outbound packet, i.e. a network data packet that is sent by the target internal network machine and has not undergone network address translation, and the first hash value is a hash value obtained by performing hash calculation on the original outbound packet.

Optionally, the hash calculation may be, but is not limited to, a 5-tuple hash algorithm through which to perform hash calculation on the first packet; and the gateway machine may be, but is not limited to, a network address translation machine.

Optionally, the pre-configured port dictionary may be, but is not limited to, a port dictionary pre-generated through a port range of a TCP/IP, and the port range may include, but is not limited to, a port range 0-65535 specified by the TCP/IP.

Optionally, in the method for shunting clustered gateways, a port dictionary is pre-generated and stored in the shunt and all gateway machines, and is generated during cluster initialization. Only a static hash dictionary needs to be configured, and once the static hash dictionary is configured, the hash dictionary does not need to be modified.

It should be noted that in the method for shunting clustered gateways, shunting algorithms are independent of service types, and only the static hash dictionary needs to be configured, and once static hash dictionary is configured, the hash dictionary does not need to be modified. In addition, the shunt in the method for shunting clustered gateways does not need to be configured with service-related network address translation rules, and high-speed hardware can be used for implementing shunting operation of the clustered gateways, greatly increasing a forwarding efficiency of the shunt and reducing resource consumption.

In the embodiments of the present disclosure, in response to receiving a first packet sent by a target internal network machine, a first hash value is received, wherein the first hash value is generated by a shunt of a public network gateway cluster, and the shunt is configured to perform a hash calculation on the first packet based on a pre-configured port dictionary; a target gateway machine is selected from the public network gateway cluster, according to the first hash value; and the first packet is sent to the target gateway machine, to achieve that sending a packet to a target gateway machine on the basis of a pre-configured port dictionary, thereby the technical effects of increasing the forwarding efficiency of a shunt and reducing resource consumption is achieved.

In an optional embodiment, before the shunt of the public network gateway cluster receives the first packet sent by the target internal network machine, the method further comprises: the port dictionary is configured on the basis of a preset port range.

Optionally, the port dictionary is information configured on the shunt of the public network gateway cluster and at least one public network machine, and at least one port field in the port dictionary include: at least one hash bucket and at least one port linked list, each of the at least one hash bucket comprising one port linked list, and multiple non-repeated addresses are existed in one port linked lists of different hash buckets.

Optionally, the pre-configured port dictionary may be, but is not limited to, a port dictionary pre-generated through a port range of a TCP/IP stack, and the port range may include, but is not limited to, a port range 0-65535 specified by the TCP/IP.

It should be noted that the port field of the port dictionary are consisted of two parts, i.e. at least one hash bucket and at least one port linked list, wherein one port linked list exists in each of the at least one hash bucket, and multiple non-repeated addresses are existed in the one port linked lists of different hash buckets, to ensure that when shunting of large-scale clustered gateways is performed, public network IPs and ports allocated for use by different gateway machines are not repeated. The port dictionary is a static port dictionary, generated during cluster initialization, stored in the shunt and all gateway machines, and does not change once the port dictionary is generated.

Figure 2:
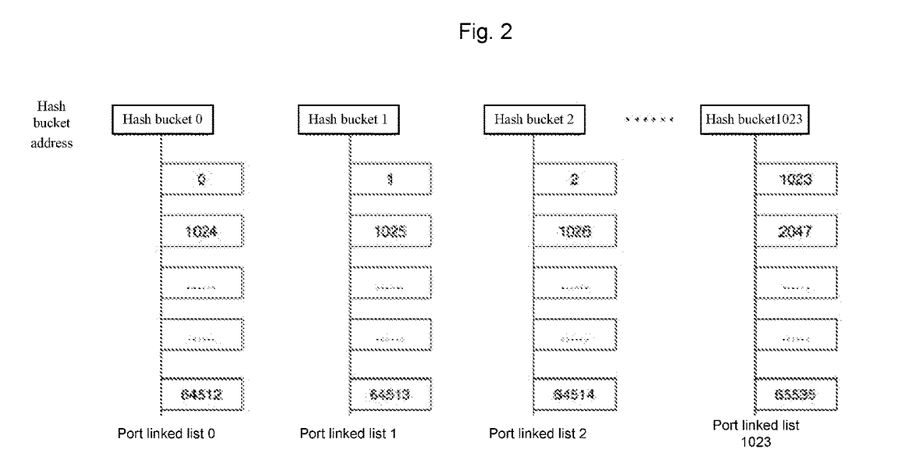
FIG. 2 is a schematic diagram of optional port fields according to the first embodiment of the present disclosure.

As an optional embodiment, FIG. 2 is a schematic diagram of optional port fields according to the first embodiment of the present disclosure. As shown in FIG. 2, in the port fields, there are 1024 hash buckets (i.e. hash bucket 0 to hash bucket 1023) which correspond to port linked list 0 to port linked list 1023 respectively, that is to say, each hash bucket corresponds to one port linked list, and multiple non-repeated addresses exist on one port linked list of each of the hash buckets. For example, address information in a port linked list 0 corresponding to a hash bucket 0 includes an address 0, an address 01024, . . . , and an address 064512, and address information corresponding to a port linked list 1 corresponding to a hash bucket 1 comprises an address 1, an address 01025, . . . , and an address 064513, to ensure that when shunting of large-scale clustered gateways is performed, public network IPs and ports allocated for use by different gateway machines are not repeated.

In an optional embodiment, a target gateway machine is selected from the public network gateway cluster, according to the first hash value includes:
  step S202, a mapping relationship between each public network machine in the public network gateway cluster and the first hash value is acquired; and
  step S204, the target gateway machine from the public network gateway cluster is selected on the basis of the mapping relationship and the first hash value.

Optionally, the first hash value and each public network machine have a many-to-one mapping relationship, that is to say, each public network machine may correspond to multiple first hash values.

It should be noted that by a mapping relationship between each public network machine in the public network gateway cluster and the first hash value is acquired, and the target gateway machine from the public network gateway cluster is selected on the basis of the mapping relationship and the first hash value, to achieve that when shunting of large-scale clustered gateways is performed, inbound traffic and outbound traffic of the same flow is shunted to the same gateway machine for processing.

Figure 3:
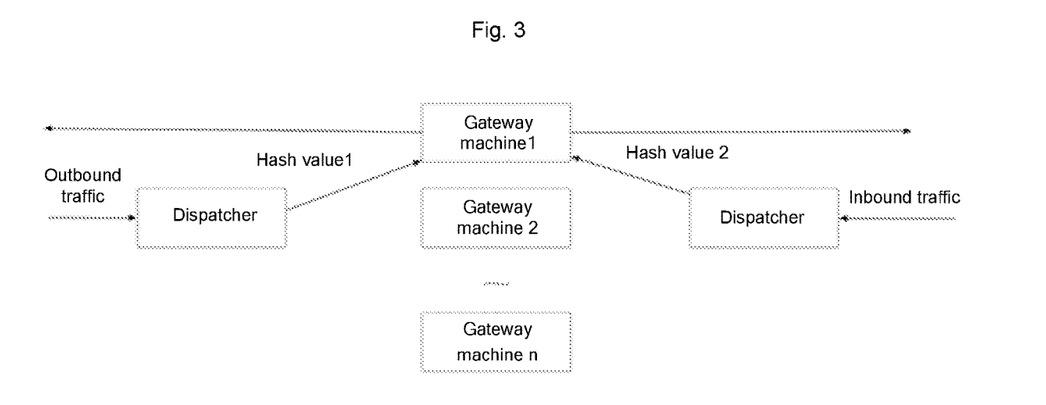
FIG. 3 is a schematic diagram of an optional method for selecting a gateway machine according to the first embodiment of the present disclosure.

As an optional embodiment, FIG. 3 is a schematic diagram of an optional method for selecting a gateway machine according to the first embodiment of the present disclosure. As shown in FIG. 3, the outbound traffic and the inbound traffic correspond to different hash values, i.e. a hash value 1 and a hash value 2. And the outbound traffic and the inbound traffic are transmitted to a gateway machine 1 by means of dispatchers, so as to ensure that the inbound traffic and the outbound traffic of the same flow are shunted to the same gateway machine for processing.

In an optional embodiment, the first packet is sent to the target gateway machine includes following steps.

At step S302, the first packet is encapsulated through the shunt to obtain a first tunnel packet.

At step S304, the first tunnel packet is sent to the target gateway machine through a diverter after writing the first hash value into an outer-layer field of the first tunnel packet.

Optionally, the target gateway machine is used for forwarding the first tunnel packet to a public network on the basis of at least one target port corresponding to the first tunnel packet.

It should be noted that the first hash value is written into the outer-layer field of the first tunnel packet, wherein the first tunnel packet is obtained by encapsulating the first packet by the shunt; the first tunnel packet is sent to the target gateway machine through a diverter, wherein after the target gateway machine receives the first tunnel packet sent by the diverter, a hash bucket is selected according to a hash value corresponding to the first tunnel packet, and a target port corresponding to the first tunnel packet is selected from a port linked list of the hash bucket; and network address translation processing is performed on an inner-layer packet of the first tunnel packet, so as to obtain translated inner-layer packet, and a target port corresponding to the first tunnel packet is selected through the target gateway machine, and the first tunnel packet is forwarded to a public network.

In the present embodiment, by encapsulating the first packet through the shunt to obtain the first tunnel packet; and the first tunnel packet is sent to the target gateway machine through the diverter after the first hash value is written into an outer-layer field of the first tunnel packet, to achieve that a packet is divert to the target gateway machine on the basis of the pre-configured port dictionary, thereby technical effects of increasing the forwarding efficiency of a shunt is achieved and resource consumption is reduced.

Figure 4:
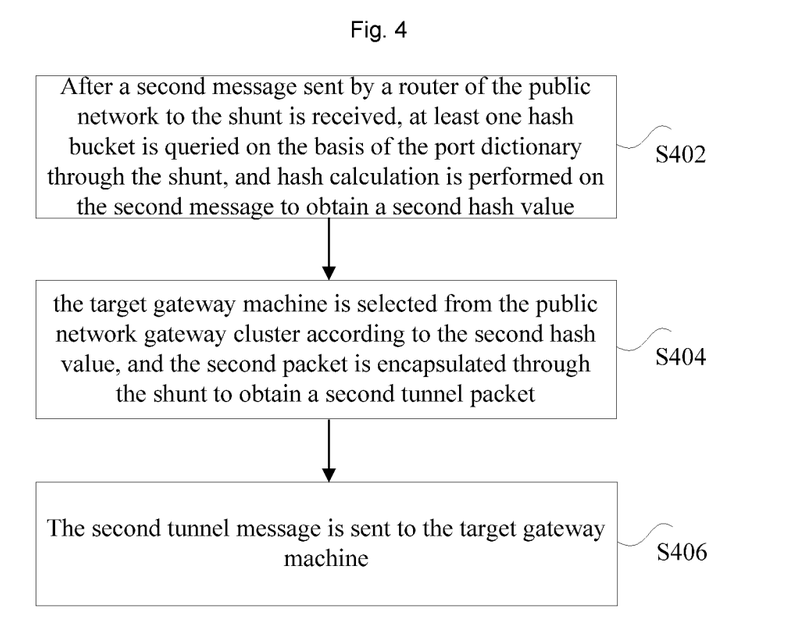
FIG. 4 is a flowchart of steps of an optional method for shunting clustered gateways according to the first embodiment of the present disclosure.

As an optional embodiment, FIG. 4 is a flowchart of steps of an optional method for shunting clustered gateways according to the first embodiment of the present disclosure. As shown in FIG. 4, the method for shunting clustered gateways includes the following steps.

At step S402, after a second packet sent by a router of the public network to the shunt is received, at least one hash bucket is queried on the basis of the port dictionary through the shunt, and hash calculation is performed on the second packet to obtain a second hash value.

At step S404, the target gateway machine is selected from the public network gateway cluster according to the second hash value, and the second packet is encapsulated through the shunt to obtain a second tunnel packet.

At step S406, the second tunnel packet is sent to the target gateway machine, wherein the target gateway machine is used for sending the second tunnel packet to the target internal network machine after performing network address translation on the basis of a predetermined connection trace table.

Optionally, the second packet is an inbound packet, wherein the inbound packet is obtained by forwarding by the router of the public network; and the second hash value is obtained by performing hash calculation on the second packet (i.e. the inbound packet), wherein the hash calculation may be, but is not limited to, performing hash calculation on the second packet by using a 5-tuple hash algorithm.

It should be noted that the connection trace table is used for recording a source IP address, a source port, a protocol, a destination IP address, destination port information before network address translation, and a source IP address, a source port, a protocol, a destination IP address, and destination port information after the network address translation, wherein information before network address translation and information after network address translation which are recorded in the connection trace table with a one-to-one correspondence relationship, and after the target gateway machine can perform network address translation according to the connection trace table, the second tunnel packet is sent to the target internal network machine, so as to ensure that inbound traffic and outbound traffic of the same flow are shunted to the same gateway machine for processing.

It should be noted that for optional or preferred embodiments of the present embodiment, reference can be made to the relevant description in the method embodiments for shunting clustered gateways, and details will not be repeated herein. Acquisition, storage and application, etc. of personal information of users involved in the technical solutions of the present disclosure all comply with the requirements of relevant laws and regulations, and do not violate public order and good custom.

According to the embodiments of the present disclosure, another embodiment of a method for shunting clustered gateways is provided. The method for shunting clustered gateways includes the following method steps.

At step S502, receiving a first packet from a shunt of a public network gateway cluster.

At step S504, forwarding the first packet to a public network on the basis of a target port corresponding to the first packet.

Optionally, the first packet is an original outbound packet, i.e. a network data packet that is sent by a target internal network machine and has not undergone network address translation.

Optionally, when the shunt receives the first packet sent by a target internal network machine, a first hash value obtained by performing hash calculation on the first packet is acquired, and a target gateway machine is selected from the public network gateway cluster according to the first hash value, wherein the first hash value is generated by the shunt performing the hash calculation on the first packet on the basis of a pre-configured port dictionary.

Optionally, a mapping relationship between each public network machine in the public network gateway cluster and the first hash value is acquired, and the target gateway machine is selected from the public network gateway cluster on the basis of the mapping relationship and the first hash value, wherein a many-to-one mapping relationship is existed between the first hash value and each public network machine.

It should be noted that the first packet from the shunt of the public network gateway cluster is received, the first packet is forwarded to a public network on the basis of a target port corresponding to the first packet, to ensure that public network IPs and ports allocated for use by different gateway machines are not repeated, when shunting of large-scale clustered gateways is performed, thereby the technical effect of increasing the forwarding efficiency of a shunt is achieved.

In an optional embodiment, a first packet from a shunt of a public network gateway cluster is received includes: a first tunnel packet sent through a diverter of the shunt is received.

Optionally, the shunt encapsulates the first packet to obtain a first tunnel packet, and writes the first hash value into an outer-layer field of the first tunnel packet.

It should be noted that the first tunnel packet at least includes an outer-layer field and an inner-layer field, wherein the first hash value is written into the outer-layer field of the first tunnel packet, network address translation processing is performed on the inner-layer packet, and the translated inner-layer field is sent to the public network.

Figure 5:
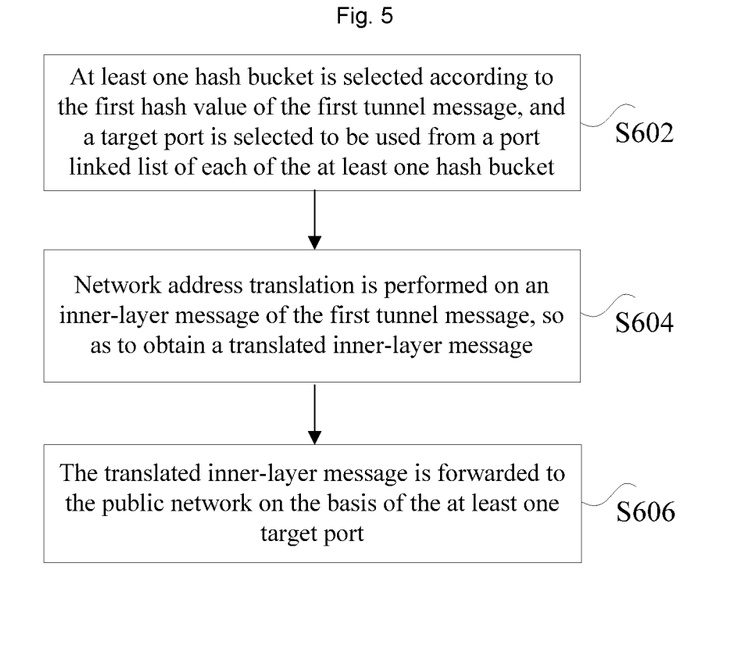
FIG. 5 is a flowchart of steps of another optional method for shunting clustered gateways according to a second embodiment of the present disclosure.

FIG. 5 is a flowchart of steps of another optional method for shunting clustered gateways according to a second embodiment of the present disclosure. As shown in FIG. 5, forwarding the first packet to a public network on the basis of a target port corresponding to the first packet comprises the following steps.

At step S602, at least one hash bucket is selected according to the first hash value of the first tunnel packet, and a target port is selected to be used from a port linked list of each of the at least one hash bucket.

At step S604, network address translation is performed on an inner-layer packet of the first tunnel packet, so as to obtain a translated inner-layer packet.

At step S606, the translated inner-layer packet is forwarded to the public network on the basis of the at least one target port.

Optionally, a diverter is used for sending the first tunnel packet to the target gateway machine, after the target gateway machine receives the first tunnel packet sent by the diverter, a hash bucket is selected according to a hash value corresponding to the first tunnel packet, and a target port corresponding to the first tunnel packet is selected from a port linked list of the hash bucket; and network address translation processing is performed on an inner-layer packet of the first tunnel packet, so as to obtain the translated inner-layer packet, and a target port corresponding to the first tunnel packet is selected through the target gateway machine, and the first tunnel packet is forwarded to a public network.

In the present embodiment, a hash bucket is selected according to the first hash value of the first tunnel packet, and a target port is selected to be used from a port linked list of the hash bucket; network address translation is performed on an inner-layer packet of the first tunnel packet, so as to obtain a translated inner-layer packet; and the translated inner-layer packet is forwarded to the public network on the basis of the target port, to achieve that a packet is sent to a target gateway machine on the basis of a pre-configured port dictionary.

It should be noted that for optional or preferred embodiments of the present embodiment, reference can be made to the relevant description in the method embodiments for shunting clustered gateways, and details will not be repeated herein. Acquisition, storage and application, etc. of personal information of users involved in the technical solutions of the present disclosure all comply with the requirements of relevant laws and regulations, and do not violate public order and good custom.

Figure 6:
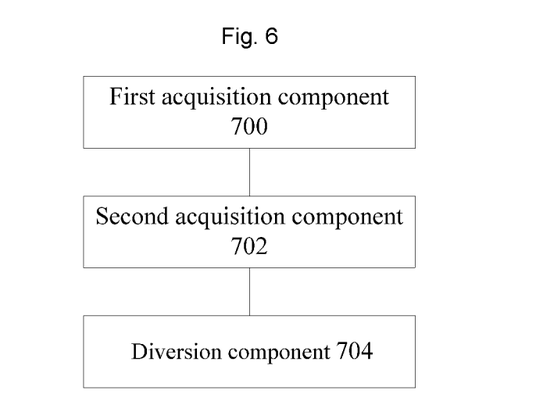
FIG. 6 is a schematic structural diagram of an apparatus for shunting clustered gateways according to a third embodiment of the present disclosure.

According to embodiments of the present disclosure, an apparatus embodiment for implementing the methods for shunting clustered gateways is further provided. FIG. 6 is a schematic structural diagram of an apparatus for shunting clustered gateways according to a third embodiment of the present disclosure. As shown in FIG. 6, the apparatus for shunting clustered gateways comprises: a first acquisition component 700, a second acquisition component 702, and a diversion component 704.

The first acquisition component 700 is configured to acquire, in response to receiving a first packet sent by a target internal network machine, a first hash value, wherein the first hash value is generated by a shunt of a public network gateway cluster, and the shunt is configured to perform a hash calculation on the first packet based on a pre-configured port dictionary; the second acquisition component 702 is configured to select, according to the first hash value, a target gateway machine from the public network gateway cluster; and the diversion component 704 is configured to divert the first packet to the target gateway machine.

It should be noted that the components can be implemented by software or hardware. For example, the latter may be implemented in the following manner: the components can be located in the same processor; or the components are located in different processors in an arbitrary combination manner.

Herein, it should be noted that the first acquisition component 700, the second acquisition component 702, and the diversion component 704 correspond to step S102 to step S106 in the Embodiment, and examples and application scenarios implemented by the components are the same as those implemented by the corresponding steps, but are not limited to the content disclosed in the Embodiment. It should be noted that the components, as a part of the apparatus, can be run in a computer terminal.

As an optional embodiment, the apparatus further includes: a configuration component, configured to configure the port dictionary on the basis of a preset port range, wherein the port dictionary is information configured on the shunt of the public network gateway cluster and at least one public network machine, and at least one port field in the port dictionary includes: at least one hash bucket and at least one port linked list, each of the at least one hash bucket comprising one port linked list, and multiple non-repeated addresses are existed in the one port linked lists in each of the of different hash buckets.

As an optional embodiment, the second acquisition component includes: a third acquisition component, configured to acquire a mapping relationship between each public network machine in the public network gateway cluster and the first hash value, wherein a many-to-one mapping relationship is existed between the first hash value and each public network machine; and a selection component, configured to select the target gateway machine from the public network gateway cluster on the basis of the mapping relationship and the first hash value.

As an optional embodiment, the diversion component includes: a first encapsulation component, configured to encapsulate the first packet through the shunt to obtain a first tunnel packet; and an importing component, configured to send the first tunnel packet to the target gateway machine through a diverter after writing the first hash value into an outer-layer field of the first tunnel packet, wherein the target gateway machine is used for forwarding the first tunnel packet to a public network on the basis of at least one target port corresponding to the first tunnel packet.

As an optional embodiment, the apparatus further includes: a calculation component, configured to after receiving a second packet sent by a router of the public network to the shunt, query through the shunt and on the basis of the port dictionary to obtain at least one hash bucket, and perform hash calculation on the second packet to obtain a second hash value; a second encapsulating component, configured to select the target gateway machine from the public network gateway cluster according to the second hash value, and encapsulate the second packet through the shunt to obtain a second tunnel packet; and a sending component, configured to send the second tunnel packet to the target gateway machine, wherein the target gateway machine is used for sending the second tunnel packet to the target internal network machine after performing network address translation on the basis of a predetermined connection trace table.

According to the embodiments of the present disclosure, another embodiment of an apparatus for shunting clustered gateways is provided. The apparatus may include: a receiving component, configured to receive a first packet from a shunt of a public network gateway cluster, wherein in response to the shunt receiving the first packet sent by a target internal network machine, a first hash value is acquired, and a target gateway machine is selected from the public network gateway cluster according to the first hash value, wherein the first hash value is generated by the shunt performing a hash calculation on the first packet based on a pre-configured port dictionary; and a forwarding component, configured to forward the first packet to a public network on the basis of at least one target port corresponding to the first packet.

As an optional embodiment, the receiving component includes: a first receiving sub-component, configured to receive a first tunnel packet sent by a diverter of the shunt, wherein a first tunnel packet is obtained by the shunt encapsulating the first packet, and the first hash value is written into an outer-layer field of the first tunnel packet.

As an optional embodiment, the forwarding component includes: a selection component, configured to select at least one hash bucket according to the first hash value of the first tunnel packet, and select the at least one target port to be used from a port linked list of each of the at least one hash bucket; a translation component, configured to perform network address translation on an inner-layer packet of the first tunnel packet, so as to obtain a translated inner-layer packet; and a first forwarding sub-component, configured to forward the translated inner-layer packet to the public network on the basis of the at least one target port.

It should be noted that for optional or preferred embodiments of the present embodiment, reference can be made to the relevant description in the Embodiment, and details will not be repeated herein.

The apparatus for shunting clustered gateways can further include at least one processor and at least one memory; the first acquisition component 700, the second acquisition component 702, and the diversion component 704, etc., as program elements, are all stored in the at least one memory, and the at least one processor executes the program elements stored in the at least one memory to implement corresponding functions.

The at least one processor includes a kernel, and the kernel calls a corresponding program element from the at least one memory, and one or more kernel may be provided. The at least one memory may include forms such as a non-permanent memory, a random access memory (RAM) and/or a non-transitory memory in a computer-readable medium, for example, a read-only memory (ROM) or a flash memory (flash RAM), and the memory includes at least one memory chip.

According to the embodiments of the present disclosure, the present disclosure further provides an electronic device, a non-transitory computer-readable storage medium, and a computer program product.

Figure 7:
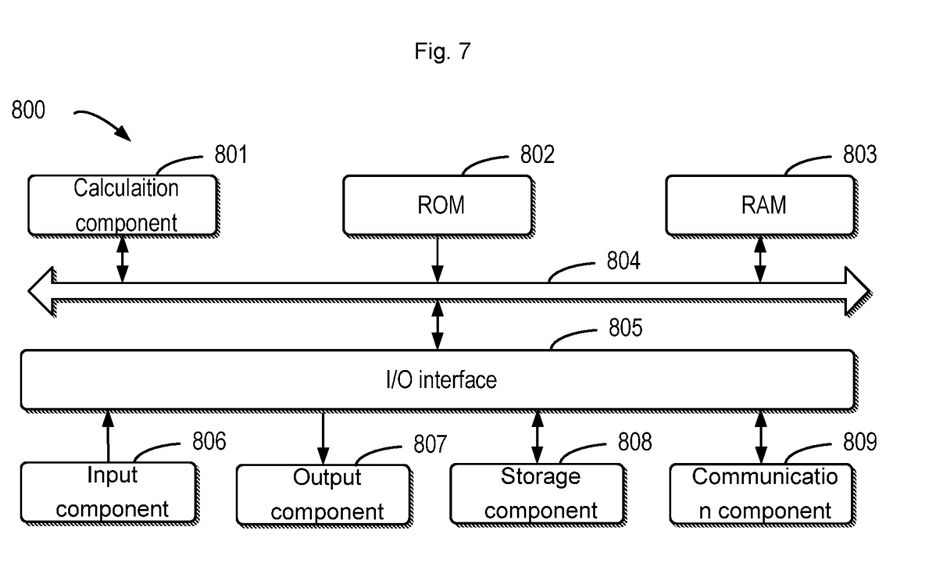
FIG. 7 is a block diagram of an optional electronic device for implementing embodiments of the present disclosure.

FIG. 7 illustrates a schematic block diagram of an exemplary electronic device 800 which can be used for implementing the embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile apparatuses, such as at least one personal digital processor, at least one cellular telephone, at least one smart phone, at least one wearable device, and other similar computing apparatuses. The components, connections and relationships therebetween, and functions thereof illustrated herein are by way of examples only, and are not intended to limit the implementation of the embodiments of the present disclosure as described and/or claimed herein.

As shown in FIG. 7, the device 800 includes a calculation component 801 which may perform various suitable actions and processes according to a computer program stored in a read only memory (ROM) 802 or a computer program loaded into a random access memory (RAM) 803 from a storage component 808. In the RAM 803, various programs and data necessary for the operation of the storage device 800 can also be stored. The calculation component 801, the ROM 802 and the RAM 803 are connected to one another by means of a bus 804. An input/output (I/O) interface 805 is also connected to the bus 804.

A number of components in the device 800 are connected to the I/O interface 805, including: an input component 806, such as a keyboard, mouse, etc.; an output component 807 such as various types of displays, speakers, etc.; a storage component 808 such as a magnetic disk, an optical disk, etc.; and a communication component 809 such as a network card, a modem, a wireless communication transceiver. The communication component 809 allows the device 800 to exchange information/data with other devices via a computer network such as the Internet and/or various telecommunication networks.

The calculation component 801 may be a variety of general-purpose and/or special-purpose processing assemblies having processing and calculation capabilities. Some examples of the calculation component 801 include, but are not limited to, a central processing unit (CPU), a graphics processing unit (GPU), a variety of special-purpose artificial intelligence (AI) computing chips, a variety of calculation components running machine learning model algorithms, a digital signal processor (DSP), and any suitable processor, controller, microcontroller, etc. The calculation component 801 executes the methods and processes as described above, for example, in response to that a first packet sent by a target internal network machine is received, a first hash value obtained by performing hash calculation on the first packet is acquired. For example, in some embodiments, in the method, acquiring, in response to a first packet sent by a target internal network machine is received, a first hash value obtained by performing hash calculation on the first packet may be implemented as a computer software program, which is tangibly included in a machine-readable medium, for example, the storage component 808. In some embodiments, a part or all of the computer program may be loaded into and/or installed into the device 800 via the ROM 802 and/or the communication component 809. In response to the computer program is loaded into the RAM 803 and executed by the calculation component 801, at least one step of acquiring, in response to a first packet sent by a target internal network machine is received, a first hash value obtained by performing hash calculation on the first packet in the method described above are performed. Alternatively, in other embodiments, the calculation component 801 may be configured to perform, in any other suitable manner (for example, by means of firmware), the method in which when a first packet sent by a target internal network machine is received, a first hash value obtained by performing hash calculation on the first packet is acquired.

Various embodiments of the systems and techniques described above herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software, and/or combinations thereof. These various embodiments may include: implementations in at least one computer program, wherein the at least one computer programs can be executed and/or interpreted on a programmable system including at least one programmable processor, the programmable processor may be a special-purpose or general-purpose programmable processor, may receive data and instructions from a storage system, at least one input apparatus and at least one output apparatus, and may transmit the data and instructions to the storage system, the at least one input apparatus and the at least one output apparatus.

Program codes for implementing the methods of the present disclosure may be written in any combination of at least one programming languages. These program codes may be provided to a processor or controller of a general-purpose computer, a special-purpose computer or other programmable data processing apparatuses, such that the program codes, when executed by the processor or controller, cause the functions/operations specified in the flowcharts and/or block diagram to be executed. The program codes may be entirely executed on a machine and partly executed on a machine, and as a standalone software package, partly executed on a machine and partly executed on a remote machine, or entirely executed on a remote machine or server.

In the context of the present disclosure, a machine-readable medium may be tangible media that may contain or store programs for use by an instruction execution system, apparatus or device, or for use in connection with the instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combinations of the described content. More specific examples of machine-readable storage media include electrical connection based on at least one wire, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations of the described content.

To provide interaction with a user, the systems and techniques described herein may be implemented on a computer having: a display apparatus (e.g. CRT (cathode ray tube) or LCD (liquid crystal display) monitor) for displaying information to the user; and a keyboard and a pointing apparatus (e.g. mouse or trackball) by which the user can provide an input to the computer. Other kinds of apparatuses may also be used to provide interaction with the user; for example, feedback provided to the user can be any form of sensing feedback (e.g. visual feedback, auditory feedback or tactile feedback); and input from the user may be received in any form (including acoustic input, speech input or tactile input).

The systems and techniques described herein may be implemented in a computing system including a backend component (e.g. as a data server), or a computing system including a midware component (e.g. an application server), or a computing system including a front-end component (e.g. a user computer having a graphical user interface or a web browser through which the user may interact with embodiments of the systems and techniques described herein), or computing systems including any combination of such a backend component, midware component, or front-end component. The components of the system may be interconnected by any form or medium of digital data communication (e.g. a communication network). Examples of the communication network include: a local area network (LAN), a wide area network (WAN), and an Internet.

The computer system may include a client and a server. The client and the server are generally away from each other and typically interact via a communication network. A client-server relationship is generated by computer programs running on respective computers and having a client-server relationship to each other. The server may be a cloud server, may also be a server of a distributed system, or a server combined with a blockchain.

It should be understood that the steps may be reordered, added, or deleted by using the various forms of flows as shown above. For example, the steps disclosed in the present disclosure may be executed in parallel, may also be executed sequentially, and may also be executed in a different order, as long as desired results of the technical solutions disclosed in the present disclosure can be achieved, which are not limited herein.

The specific embodiments do not limit the scope of protection of the present disclosure. It will be apparent to a person skilled in the art that various modifications, combinations, sub-combinations, and replacements can be made according to design requirements and other factors. Any modifications, equivalent replacements, improvements, etc. made within the spirit and principle of the present disclosure shall belong to the scope of protection of the present disclosure.

The invention claimed is:

1. A method for shunting clustered gateways, comprising:
   in response to receiving a first packet sent by a target internal network machine, acquiring a first hash value, wherein the first hash value is generated by a shunt of a public network gateway cluster, and the shunt is configured to perform a hash calculation on the first packet based on a pre-configured port dictionary;
   selecting a target gateway machine from the public network gateway cluster according to the first hash value;
   sending the first packet to the target gateway machine; and
   configuring the port dictionary on the basis of a preset port range, wherein the port dictionary is information configured on the shunt of the public network gateway cluster and at least one public network machine, and at least one port field in the port dictionary comprises at least one hash bucket and at least one port linked list, each of the at least one hash bucket comprising one port linked list, and a plurality of non-repeated addresses are existed in the one port linked lists of different hash buckets.

2. The method as claimed in claim 1, wherein selecting a target gateway machine from the public network gateway cluster according to the first hash value comprises:
   acquiring a mapping relationship between each public network machine in the public network gateway cluster and the first hash value, wherein a many-to-one mapping relationship is existed between the first hash value and each public network machine; and
   selecting the target gateway machine from the public network gateway cluster on the basis of the mapping relationship and the first hash value.

3. The method as claimed in claim 1, wherein sending the first packet to the target gateway machine comprises:
   encapsulating the first packet through the shunt to obtain a first tunnel packet; and
   sending the first tunnel packet to the target gateway machine through a diverter after writing the first hash value into an outer-layer field of the first tunnel packet, wherein the target gateway machine is used for forwarding the first tunnel packet to a public network on the basis of at least one target port corresponding to the first tunnel packet.

4. The method as claimed in claim 3, wherein the method further comprises:
   after receiving a second packet sent by a router of the public network to the shunt, querying at least one hash bucket on the basis of the port dictionary through the shunt, and performing hash calculation on the second packet to obtain a second hash value;
   selecting the target gateway machine from the public network gateway cluster according to the second hash value, and encapsulating the second packet through the shunt to obtain a second tunnel packet; and
   sending the second tunnel packet to the target gateway machine, wherein the target gateway machine is used for sending the second tunnel packet to the target internal network machine after performing network address translation on the basis of a predetermined connection trace table.

5. The method as claimed in claim 1, wherein the first packet is an original outbound packet.

6. The method as claimed in claim 1, wherein the port dictionary is a static port dictionary.

7. The method as claimed in claim 1, wherein the hash calculation is performed on the first packet to obtain the first hash value through a 5-tuple hash algorithm.

8. The method as claimed in claim 3, wherein the method further comprises:
   after the target gateway machine receives the first tunnel packet sent by the diverter, selecting a hash bucket in the port dictionary according to a hash value corresponding to the first tunnel message.

9. The method as claimed in claim 3, wherein the target port corresponding to the first tunnel packet is selected from a port linked list of the hash bucket.

10. The method as claimed in claim 4, wherein the second packet is an inbound packet.

11. The method as claimed in claim 4, wherein the hash calculation is performed on the second packet to obtain the second hash value through a 5-tuple hash algorithm.

12. A method for shunting clustered gateways, comprising:
- receiving a first packet from a shunt of a public network gateway cluster, wherein in response to the shunt receiving the first packet sent by a target internal network machine, a first hash value is acquired, and according to the first hash value, a target gateway machine is selected from the public network gateway cluster, wherein the first hash value is generated by the shunt performing a hash calculation on the first packet based on a pre-configured port dictionary;
- forwarding the first packet to a public network on the basis of at least one target port corresponding to the first packet; and
- configuring the port dictionary on the basis of a preset port range, wherein the port dictionary is information configured on the shunt of the public network gateway cluster and at least one public network machine, and at least one port field in the port dictionary comprises at least one hash bucket and at least one port linked list, each of the at least one hash bucket comprising one port linked list, and a plurality of non-repeated addresses are existed in the one port linked lists of different hash buckets.

13. The method as claimed in claim 12, wherein receiving the first packet from the shunt of a public network gateway cluster comprises:
- receiving a first tunnel packet sent by a diverter of the shunt, wherein a first tunnel packet is obtained by the shunt encapsulating the first packet, and the first hash value is written into an outer-layer field of the first tunnel packet.

14. The method as claimed in claim 13, wherein forwarding the first packet to the public network on the basis of the at least one target port corresponding to the first packet comprises:
- selecting at least one hash bucket according to the first hash value of the first tunnel packet, and selecting the at least one target port to be used from a port linked list of each of the at least one hash bucket;
- performing network address translation on an inner-layer packet of the first tunnel packet, so as to obtain a translated inner-layer packet; and
- forwarding the translated inner-layer packet to the public network on the basis of the at least one target port.

15. An electronic device, comprising:
- at least one processor; and
- a memory in communication connection with the at least one processor,
- wherein the memory stores instructions which can be executed by the at least one processor, and the instructions are executed by the at least one processor, so that the at least one processor can perform the following steps:
- in response to receiving a first packet sent by a target internal network machine, acquiring a first hash value, wherein the first hash value is generated by a shunt of a public network gateway cluster, and the shunt is configured to perform a hash calculation on the first packet based on a pre-configured port dictionary;
- selecting a target gateway machine from the public network gateway cluster according to the first hash value;
- sending the first packet to the target gateway machine; and
- configuring the port dictionary on the basis of a preset port range, wherein the port dictionary is information configured on the shunt of the public network gateway cluster and at least one public network machine, and at least one port field in the port dictionary comprises at least one hash bucket and at least one port linked list, each of the at least one hash bucket comprising one port linked list, and a plurality of non-repeated addresses are existed in the one port linked lists of different hash buckets.

16. The electronic device as claimed in claim 15, wherein selecting a target gateway machine from the public network gateway cluster according to the first hash value comprises:
- acquiring a mapping relationship between each public network machine in the public network gateway cluster and the first hash value, wherein a many-to-one mapping relationship is existed between the first hash value and each public network machine; and
- selecting the target gateway machine from the public network gateway cluster on the basis of the mapping relationship and the first hash value.

17. The electronic device as claimed in claim 15, wherein sending the first packet to the target gateway machine comprises:
- encapsulating the first packet through the shunt to obtain a first tunnel packet; and
- sending the first tunnel packet to the target gateway machine through a diverter after writing the first hash value into an outer-layer field of the first tunnel packet, wherein the target gateway machine is used for forwarding the first tunnel packet to a public network on the basis of at least one target port corresponding to the first tunnel packet.

18. The electronic device as claimed in claim 17, wherein the method further comprises:
- after receiving a second packet sent by a router of the public network to the shunt, querying at least one hash bucket on the basis of the port dictionary through the shunt, and performing hash calculation on the second packet to obtain a second hash value;
- selecting the target gateway machine from the public network gateway cluster according to the second hash value, and encapsulating the second packet through the shunt to obtain a second tunnel packet; and
- sending the second tunnel packet to the target gateway machine, wherein the target gateway machine is used for sending the second tunnel packet to the target internal network machine after performing network address translation on the basis of a predetermined connection trace table.

* * * * *